United States Patent [19]
Gupta

[11] Patent Number: 4,953,160
[45] Date of Patent: Aug. 28, 1990

[54] DIGITAL DATA OVER VOICE COMMUNICATION

[75] Inventor: Dev V. Gupta, Flemington, N.J.

[73] Assignee: Integrated Network Corporation, Bridgewater, N.J.

[21] Appl. No.: 159,887

[22] Filed: Feb. 24, 1988

[51] Int. Cl.$^5$ .............................................. H04J 1/14
[52] U.S. Cl. ......................................... 370/76; 375/17
[58] Field of Search .................. 370/76, 69.1; 375/18, 375/61, 17

[56] References Cited

U.S. PATENT DOCUMENTS

| | | | |
|---|---|---|---|
| 3,622,986 | 11/1971 | Tang et al. | 375/18 |
| 3,781,873 | 12/1973 | Nussbaumer | 375/18 |
| 3,918,001 | 11/1975 | Sailer et al. | 375/61 |
| 4,103,118 | 7/1978 | Bergman | 179/170 D |
| 4,117,277 | 9/1978 | van den Elzen et al. | 375/18 |
| 4,197,431 | 4/1980 | Vis | 179/70 |
| 4,220,816 | 9/1980 | Howells et al. | 370/24 |
| 4,417,349 | 11/1983 | Hills et al. | 375/60 |
| 4,425,642 | 1/1984 | Moses et al. | 370/76 |
| 4,431,869 | 2/1984 | Sweet | 179/77 |
| 4,453,038 | 6/1984 | Eberhardt et al. | 179/81 B |
| 4,503,289 | 3/1985 | Spires | 179/16 F |
| 4,577,064 | 3/1986 | Huft et al. | 179/16 F |
| 4,584,690 | 4/1986 | Cafiero et al. | 375/18 |
| 4,646,289 | 2/1987 | Tsiakas et al. | 370/76 |
| 4,672,605 | 6/1987 | Hustig et al. | 370/76 |
| 4,757,495 | 7/1988 | Decker et al. | 370/76 |
| 4,768,206 | 8/1988 | Van Gerwen | 375/17 |
| 4,785,448 | 11/1988 | Reichert et al. | 370/76 |

FOREIGN PATENT DOCUMENTS

EP-A-0164244 9/1985 European Pat. Off. .
WO-A-8504298 12/1985 World Int. Prop. O. .

OTHER PUBLICATIONS

"Communication Networks for Computers", D. W. Davies and D. L. A. Barber, 1973, Wiley, (London, GB), Tailoring the Specturm of the Transmitted Signal, pp. 148-173 cited . . . (note-we received pp. 148,149,152,153,168,169,172,173 and two unnumbered pages with Search Report).

*Primary Examiner*—Robert L. Griffin
*Assistant Examiner*—Wellington Chin
*Attorney, Agent, or Firm*—Hamilton, Brook, Smith & Reynolds

[57] ABSTRACT

A method and apparatus is described for transmitting and receiving data signals and voice band signals over a single pair of wires, wherein the energy content of the data signals in the voice bands is transferred to a higher frequency to avoid interference between the two. This is accomplished by sinusoidally encoding the data pulses in the frequency domain. The encoding is equivalently performed in the time domain by linearly combining weighted delayed and advanced versions of the data pulses, in accordance with a weighting formula. A transversal filter is used to multiple delayed and advanced versions of the data pulses by a scaling factor times the ratio of $m!/(m-i)!i!$ factorial wherein i is the ith version being weighted, m is an integer greater than one and ! indicates the factorial function.

28 Claims, 7 Drawing Sheets

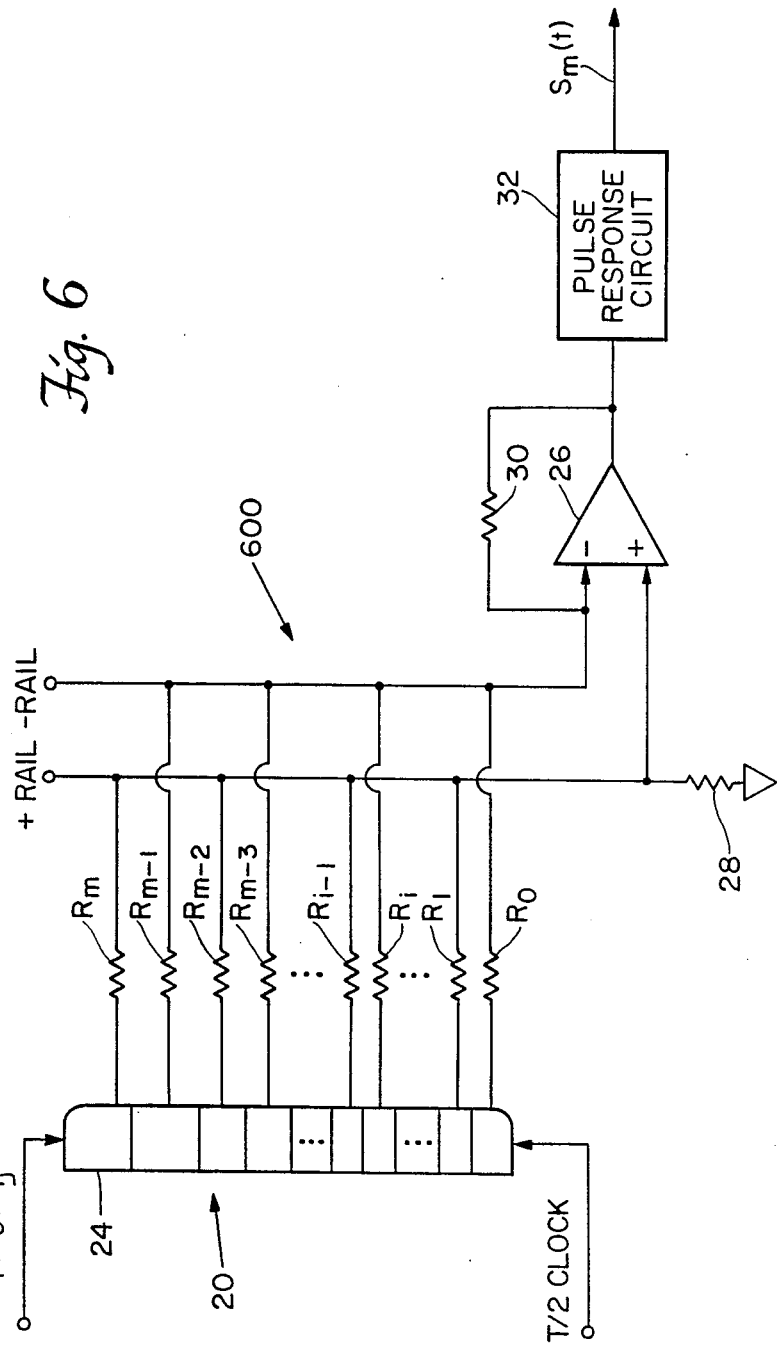

DIGITAL DATA OVER VOICE COMMUNICATION

DESCRIPTION

1. Technical Field

This invention is in the field of digital data and voice communication systems over wire cable.

2. Background Art

Telephone voice communication systems are ubiquitously deployed over most of the United States and a good portion of the world. Telephone voice communication uses the frequency band 300 Hz to 3300 Hz. A copper pair connects the end user's premises to the serving central office. This provides satisfactory voice signal transmission. As the need for data communication increases, transmission of data signals from the end user's premises to the serving central office, becomes a problem. Using voice band modems, the user can establish data communication up to about 4.8 kbps, although 9.6 kbps modems are becoming available. These modems require elaborate circuitry to condense an essentially wide band data spectrum into the 300 Hz to 3300 Hz voice band. Also, when the customer's copper pair is being used for data communication, it is not available for voice communication. Not only does the narrow voice band restrict the rate at which data communication can occur, the use of voice band modems does not allow interactive voice/data transactions to occur. Finally, since voice band data modems use the public switched network; which was designed for voice communications, the degree of performance cannot be guranteed.

Presently, high speed and high performance data applications require that the customer subscribe to a wide band four wire baseband (digital) data service, such as, Dataphone Digital Service (DDS). In DDS, high performance is obtained by leaving the data unmodulated and transmitting and receiving it through cable equalizers/pre-equalizers. In pending patent application, Ser. No. 891,462 filed July 29, 1986, Gupta discloses that by use of a pre- and post-equalizer, the copper cable media can be effectively made wide band. Baseband data in the form of Pulse Amplitude Modulated Nyquist Pulses transmitted through this cable equalizer combination results in good ($\leq 70\%$ open) eye performance. Thus, error rate performance better than $10^{-8}$ can be achieved. A thorough treatment of "eye opening" can be found in the book entitled "Data Transmission" by W. R. Bennett and J. R. Davey, page 119, McGraw Hill, 1965.

The problems with this baseband Pulse Amplitude Modulation (PAM) technique are that (1) there is a D.C. component present and (2) there are discrete frequencies present at the baud rate and its multiples. Since telephone copper cable is subject to lightning hits, power crosses, etc., it is highly desirable to interface it through transformers and protection circuitry. The presence of D.C. in the PAM data signal does not allow it to pass through a transformer. Also, energy concentrated at discrete frequency points, can cause cross-talk problems in the other wire pairs in the binder group of which the PAM signal carrying pairs are members. These two problems are solved by use of coding schemes, such as Alternate Mark Inversion (AMI) precoding, wherein the polarity of every alternate "1" is reversed to a "−1". Proof that this eliminates D.C. and discrete frequencies is complex and can be found in "Signal Theory" by L. E. Franks, pages 217–218, Prentice Hall, 1969. Franks demonstrates that the spectra of the AMI/PAM digital signal is of the form (sin Kf). X(f) which becomes zero, (i.e., no D.C.) at f=0. In general, the slope at f=0 is not zero and, hence, significant energy is present in the voice band (300 Hz to 3300 Hz). Thus, AMI/PAM and baseband voice transmission are mutually incompatible.

With the explosion of data communication, a need exists for a method and apparatus for transmission and reception of voice and data signals between terminals or nodes over a single pair of standard telephone cable. Present techniques for satisfying this need involve frequency shift keying (FSK) in which two frequency bands are required. The error performance of FSK transmission is unsatisfactory for a variety of reasons. The high frequency band is highly attenuated by even moderate length cable and so poor Signal to Noise Ratios (SNR) result leading to degraded performance. Furthermore, since the energy is clustered in narrow bands, cross-talk into other cables in the binder group is created. The more power used for transmission, the greater the cross-talk, limiting the use of other cables in the binder group for wideband services. Therefore, the signal cannot be transmitted as far as one would desire and administrative restrictions have to be placed on mixing other services in the same binder group. Complex modulation and demodulation circuits are also required for FSK and are a further detriment.

DISCLOSURE OF THE INVENTION

In the apparatus of the present invention, a coding circuit is used to encode the data signal prior to transmission. The coding circuit encodes the data signal in such a manner that the voiceband is vacated and the signal energy is spread over a relatively broad frequency spectrum. Thus, the energy is not clustered in a narrow band and cross-talk is thereby minimized. Baseband transmission is employed so that signal errors caused by FSK are avoided. No modulateors or demodulators are required. The empty voiceband can then be used for baseband "Plain Old Telephone System" (POTS) communication.

The apparatus of the present invention accepts baseband data signals which are time compressed and multiplexed for burst or packetized transmission. Baseband POTS service can simultaneously be provided on the same wire pair.

The time compressed and multiplexed pulse data signals are coupled to a pre-coder which empties the energy content of the data signals from the voiceband. This is accomplished by forming suitable weighted linear combinations or summations of the pulses with delayed and advanced versions of the pulses. This process, as will be shown, is equivalent to encoding the Fourier transform of the pulses with a sinusoidal function of the form $\sin^m \theta$; wherein $\theta = \pi fT/4$, m is an integer greater than or equal to 1, f is a frequency variable, and T is the reciprocal of the baud rate. As "m" is increased, more and more pulse energy is removed from the low frequency band to a higher frequency band.

In a specific embodiment of the invention, m=4 resulting in $\sin^4 \theta$, which equals a $$\left[ \frac{1 - \cos 2\theta}{2} \right]^2$$

pulse function shaping system. In a first embodiment of the invention, the pre-coder comprises a rail former, a time domain filter and a summing circuit. The rail former divides the AMI/PAM coded baseband time-compressed multiplexed Nyquist or Almost Nyquist pulse data signals into two sets of data streams of sequential alternate pulses from the input data stream. One data stream comprises positive going pulses and the other comprises negative going pulses. The data streams are separately coupled to a time domain filter comprising two shift registers with weighting resistors coupled to the output stages. The shift registers provide delayed and advanced versions of each pulse. The resistors are chosen and coupled to a summing device to produce a weighted sum voltage waveform having $(1 - \cos 2\theta)^2$ shaped pulses in which the energy content of the pulses is spread over a frequency range higher than the frequency of the voiceband signals. If the baseband signals are not AMI coded, only one data stream and one shift register is required for the time domain filter.

The shaped pulses are then coupled through a high pass filter, a line impedance matching resistor and a coupling transformer to the Tip and Ring lines of a standard two wire telephone balanced line for transmission to a substantially identical transmit/receive terminal at the other end of the line. Voiceband signals are also coupled onto the Tip and Ring lines through a passive low pass filter and transmitted over the same line. The received or incoming signals from the other terminals are separated into low frequency (voiceband) and high frequency (databand) signals by the low pass filter and an additional high pass filter in the receiver section. The data pulses are detected and equalized for transmission losses over the cable and divided into positive going and negative going received signals for de-multiplexing and decoding. The invention will now be described in detail in connection with the drawings.

BRIEF DESCRIPTION OF THE DRAWINGS

FIG. 6 is a schematic diagram of a sinusoidal encoder in accordance with the invention.

DESCRIPTION OF THE INVENTION

I.

Theoretical Background of the Invention

Consider a data signal [a] given by an alphabet of finite values:

$$[a] = [\cdots, a_{-1}, a_0, a_1, \cdots]$$  Equation 1 where;
  $a_i$ is an element of a finite number of discrete values; typically 0 or 1.

In baseband PAM transmission using a symbol p(t), the signal x(t) to be transmitted can be written as:

$$x(t) = \sum_{i=-\infty}^{\infty} a_i p(t - iT)$$  Equation 2 where; T is the reciprocal of the baud rate, or equivalently, the symbol period.

Figure 1:
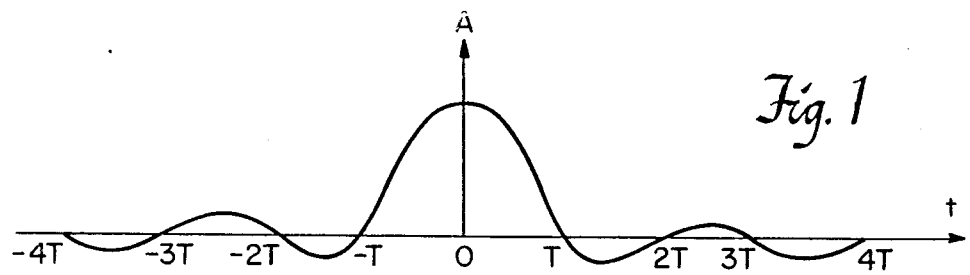
FIG. 1 is a plot of amplitude versus time for a Nyquist Pulse for the purpose of illustrating principles of the invention.

If p(t) is a Nyquist pulse, i.e., a pulse of the form shown in FIG. 1, then it should be apparent from Equation 2 that:

$$x(kT) = a_k p(o) = A a_k$$  Equation 3

Figure 2:
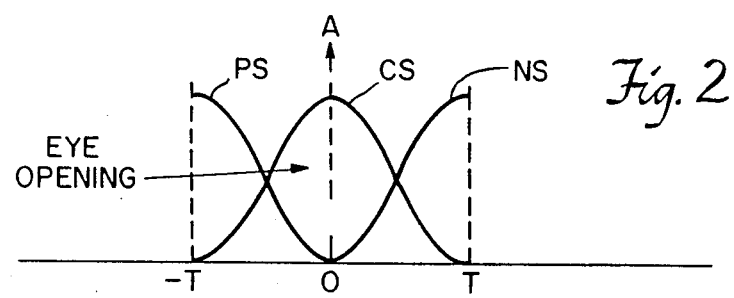
FIG. 2 is an eye diagram, amplitude versus time plot of a "Raised Cosine" Nyquist pulse for illustrating features of the invention.

Pulses of the type shown in FIG. 1 are called Nyquist pulses and have special spectral properties. as discussed in "Digital Communication" by John A. Proakis, pages 338-341, McGraw Hill, 1983. Band-limited Nyquist pulses exist and can be used to signal through band-limited channels. Since copper pairs can only be equalized over a finite bandwidth, they are good examples of band-limited channels. FIG. 2 shows the eye diagrams resulting from a "Raised Cosine" Nyquist pulse p(t) with Fourier transform P(f) where:

$$P(f) = \begin{bmatrix} 1 + \cos \pi fT \text{ for } T \leq f \leq 1/T \\ 0 \text{ otherwise} \end{bmatrix}$$  Equation 4 and the data process is binary, i.e., $a_i$ [0, 1]. In FIG. 2, the current symbol is labelled CS, the previous symbol PS, and the next symbol NS. It can be seen that the eye is 100% open at the points $t = kT, +k\epsilon\{I\}$ wherein I is the set of integers positive, negative including zero. This is because the "raised cosine" pulses are Nyquist pulses and obey the property specified by Equation 3.

Figure 3:
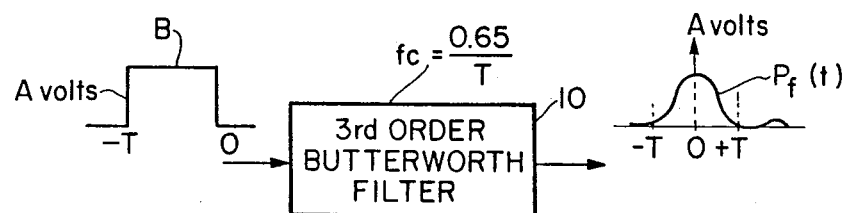
FIG. 3 is an illustration of a method for producing Almost Nyquist Pulses using a third order Butterworth Filter.

Approximations can be made to Nyquist Pulses in various ways. A common method used in DDS is shown in FIG. 3, wherein a unit amplitude pulse B of A volts amplitude is passed through a third order Butterworth filter 10. The width of the pulse A is T/2 and the cutoff frequency fc of the filter 10 is 1.30/T, which results in the formation of the pulse $p_F(t)$. The little tail running past t=T would clearly interfere with the next symbol and, therefore, the pulse is not completely Nyquist. On the other hand, the Inter Symbol Inference (ISI) caused by the little tail is relatively insignificant and the resulting eye is over 90% open. Such a pulse is thus Almost Nyquist.

DDS transmits at 0.5 bits per hertz, or one bit every T seconds using an effective bandwidth of 2/T Hz.

Thus, DDS uses twice as much bandwidth as is necessary.

It can be shown (e.g., in "Signal Theory" by L. E. Franks, McGraw Hill, 1969, page 13) that the power spectral density of the process described in Equation 2 is of the form:

$$S_{xx}(f) = Y(f) \cdot P(f) \qquad \text{Equation 5}$$

where P(f) is the Fourier transform of p(t) and Y(f) is some function of frequency.

For straight PAM, Y(f) consists of a continuous function plus impulses at discrete frequencies. The continuous function is generally non-zero at f=0. Since P(f), if it is a Nyquist pulse, is non-zero at zero frequency, in general, $S_{xx}(f)$, also contains D.C. These limitations are overcome in DDS by AMI coding.

With the above theoretical background in mind, the theory behind the present invention, which involves the subject of Sinusoidally Coded Nyquist Pulses and Sinusoidally Coded Almost Nyquist Pulses, will be explained.

II.

Sinusoidally Coded Pulses

The following is a description of the coding method of the invention whereby a pulse shape can be modified to eliminate the energy in the voice band. First, a brief digression into some mathematical constructs is necessary.

Let p(t) be a pulse function with Fourier Transform P(f). Define $P_m(f)$, which is the Fourier transform of the sinusoidally encoded pulse $p_m(t)$ as:

$$P_m(f) \overset{\Delta}{=} \frac{1}{||P_m||} (-j\sin\pi fT')^m \cdot P(f) \qquad \text{Equation 6}$$

where T'=(T/4)m is an integer, and $||P_m||$ is the normalizing function defined as:

$$||P_m|| \overset{\Delta}{=} \sqrt{\int_{-\infty}^{\infty} ||P_m(f)||^2 df} \qquad \text{Equation 7}$$

Clearly, $P_m(f)$ has unit energy as a result of the normalization. From Parseval's theorem $p_m(t)$ is also a unit energy pulse. Further, it should be clear that $P_m(0)=0$ and the first m−1 derivatives of $P_m(f)$ with respect to f are also zero at f=0. Thus, by choosing m large enough, not only can D.C. be eliminated, but the lower frequency band can also be vacated. The extent to which the low frequency band is vacated as "m" is increased is quantified below. To do this, a specific case for p(t) is chosen. The principles can then be applied to other cases.

Choose p(t) to be the least bandwidth, unit energy, Nyquist Pulse with Fourier transform P(f) given by:

$$P(f) = \begin{bmatrix} \sqrt{T} & \text{for } 1/T \leq f \leq \frac{1}{T}, \\ 0 & \text{otherwise} \end{bmatrix} \qquad \text{Equation 8}$$

Thus, $$P_m(f) = \begin{bmatrix} \frac{\sqrt{T}}{||P_m||} (-j\sin\pi fT')^m & \text{for } \frac{1}{T} \leq f \leq \frac{1}{T} \\ 0 & \text{otherwise} \end{bmatrix} \qquad \text{Equation 9}$$

and $$||P_m|| = \sqrt{T \int_{-1/T}^{1/T} \sin^{2m}\pi fT' df} \qquad \text{Equation 10}$$

It should be clear from the above that $P_m(f)$ represents the spectral shaping accomplished by sinusoidal coding of the original pulse p(t), since the specific p(t) chosen in this case is spectrally flat. Also, since, $$\int \sin^n ax\, dx = \frac{\sin^{n-1}ax \cdot \cos ax}{na} + \frac{n-1}{n} \int \sin^{n-2}ax\, dx. \qquad \text{Equation 11}$$

and applying this integral to Equation 10, it can be shown that:

$$||P_m||^2 = \frac{2m-1}{2m} ||P_{m-1}||^2, \qquad \text{Equation 12}$$

Using the fact that:

$$||P_0|| = 1; \qquad \text{Equation 13}$$

one can niteratively compute, $$\begin{aligned}
||P_0|| &= \sqrt{1} = 1 \\
||P_1|| &= \sqrt{1/2 \times 1} = 0.707 \\
||P_2|| &= \sqrt{3/4 \times 1/2 \times 1} = 0.612 \\
||P_3|| &= \sqrt{5/6 \times 3/4 \times 1/2 \times 1} = 0.559 \\
||P_4|| &= \sqrt{7/8 \times 5/6 \times 3/4 \times 1/2 \times 1} = 0.523
\end{aligned} \qquad \text{Equation 14}$$

and so on.

Figure 4:
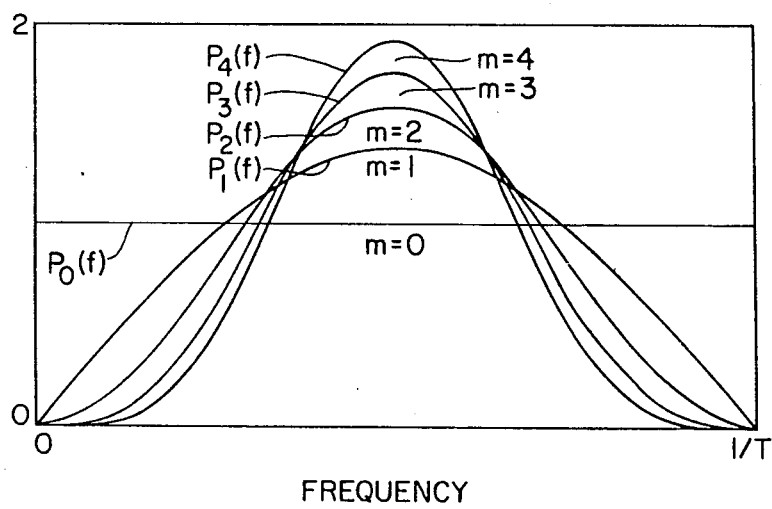
FIG. 4 is a plot of the power spectral density versus frequency of a sinusoidally encoded Nyquist pulse with increasing order of the coding parameter "m".

FIG. 4 shows a power spectral density versus frequency, plot of $|P_o(f)|$ (no coding case), $|P_1(f)|$, $|P_2(f)|$, $|P_3(f)|$ and $|P_4(f)|$. By examination of these curves, it may be seen that $|P_m(f)|$ tends to approach an impulse function at f=(1/2T) as m approaches infinity.

The coding gain CG, which is a measure of how much energy has been vacated from the low frequency band by the coding function, is computed below; wherein, "m" represents the order of the coding function. The low frequency band may be defined as a fraction $\rho$ of the total bandwidth 1/T of the signal $P_m(f)$, i.e., the low frequency band extends from 0 to $\rho/T$ where:

$\rho$ is some real number less than one half.

Then, the energy $E_m(\rho)$ in this low frequency band is given by:

$$E_m(\rho) = \int_0^{\rho/T} |P_m(f)|^2 df \quad \text{Equation 15}$$

$$= \frac{T}{||P_m||} T \int_0^{\rho/T} 0\sin^{2m}\pi fT df.$$

Again using the standard integral of Equation 10, it can be shown that:

$$E_m(\rho) = -\frac{\sin^{2m-1}\pi \cdot \cos\rho\pi}{2m\pi} + \frac{2m-1}{2m} E_{m-1}(\rho). \quad \text{Equation 16}$$

In the present example, the pulse is assumed to be a unit energy flat spectrum pulse, therefore:

$$E_o(\rho) = \rho \quad \text{Equation 17}$$

Using Equations 16 and 17, one can iteratively compute the energy, $E_m(\rho)$ for any given fraction, $\rho$ of the frequency band as "m" is increased. Since $E_o(\rho)$ represents no coding, the coding gain (CG); which is a measure of how much energy has been vacated from the low frequency band as a result of coding, can be expressed as:

$$CG(\rho,m)\Delta = 10 \log_{10}\frac{E_m(\rho)}{E_o(\rho)} \text{ (db)} \quad \text{Equation 18}$$

Using Equation 17, $$CG(\rho,m) = -10 \log_{10}E_m(\rho) + 10 \log_{10}\rho. \quad \text{Equation 19}$$

measured in db. Table 1, below, summarizes $CG(\rho,m)$ for $\rho = \frac{1}{4}$ and $1/14$, respectively for m=0, 1, 2, 3 and 4.

TABLE 1

| | Fraction of Total Bandwidth $\rho = \frac{1}{4}$ | | Fraction of Total Bandwidth $\rho = 1/14$ | |
|---|---|---|---|---|
| m | Energy $E_m(\rho)$ | Coding Gain $CG(\rho,m)$ db | Energy $E_m(\rho)$ | Coding Gain $CG(\rho,m)$ db |
| 0 | 0.25 | 0 | 7.143 × 10² | 0 |
| 1 | 4.542 × 10⁻² | 7.4 | 1.187 × 10⁻³ | 17.8 |
| 2 | 1.417 × 10⁻² | 12.5 | 3.538 × 10⁻⁵ | 33.0 |
| 3 | 5.179 × 10⁻³ | 16.8 | 1.261 × 10⁻⁶ | 47.5 |
| 4 | 2.045 × 10⁻³ | 20.9 | 5.562 × 10⁻⁸ | 61.1 |

From Table 1, it may be seen that as $\rho$ becomes smaller, the coding gain increases more and more dramatically with increasing m.

In summary, by encoding the Fourier Transform of Nyquist or Almost Nyquist pulses with a sinusoidal function of the form $\sin^m\theta$, spectral shaping of the pulses is achieved. This results in the removal, with increasing "m", of a greater and greater fraction of the energy content from the low frequency base band to a higher frequency band.

III.

Formation of Sinusoidally Coded Pulses

In accordance with the invention, a method will now be described whereby sinusoidally coded Nyquist or Almost Nyquist pulses can be formed from the original pulse $p(t)$ by forming linear combinations of $p(t)$ and its delayed and advanced versions $p(t-(kT/2))$, wherein k is an element of the set of integers (I). This results in a simple circuit implementation of a sinusoidal encoder, an embodiment of which will be described later.

Applying Euler's identity to Equation 6, it should be clear that:

$$P_m(f) \frac{1}{||P_m||} (-j \sin\pi fT)^m \cdot P(f) = \quad \text{Equation 20}$$

$$\frac{1}{||P_m||} \left[ \frac{e^{j\pi fT} - e^{-j\pi fT}}{2} \right]^m \cdot P(f)$$

Now, using the Binomial Theorem, Equation 20 becomes:

$$P_m(f) = \frac{1}{||P_m||} \sum_{i=0}^{m} (-1/2)^m \binom{m}{i} e^{-j\pi fT(m-2i)} \cdot P(f) \quad \text{Equation 21}$$

$$\text{where } \binom{m}{i} \frac{m!}{(m-i)!i!};$$

indicating the ith version of the delayed pulse and ! is the factorial sign. Taking the Fourier Inverse of Equation 21 yields the desired result:

$$p_m(t) = \frac{1}{||P_m||} \sum_{i=0}^{m} (-1/2)^m \binom{m}{i} p[t - (m - 2i)T], \quad \text{Equation 22A}$$

which is of the form expected above. Also note that Equation 22A can be written as:

$$P_m(t) = \frac{(-1/2)^m}{||P_m||} \sum_{i=0}^{m} \binom{m}{i} p[t - (m - 2i)T] \quad (22B)$$

$$= K \sum_{i=0}^{m} \binom{m}{i} p[t - (m - 2i)T] \quad (22C)$$

$$\text{where } k = \text{scaling constant} = \frac{(-1/2)^m}{||P_m||}.$$

From Equation 22B, it should be clear that the pulse $P_m(t)$ consists of delayed and advanced versions of $p(t)$ corresponding to the m+1 terms in Equation 22B. These versions are such that the $i^{th}$ term is weighted by $K(m/i)$. As an example, it is shown below that for the case m=4, there are m+1=5 terms; the weighting on the $3^{rd}$ term (i=2 case) is therefore $$K\binom{4}{2} = K\left(\frac{4 \times 3}{1 \times 2}\right)$$

is 6K, which checks with Equation 22₄ below. Expanding Equation 22A for m=0,1,2,3 and 4, one obtains:

$$P_0(t) = \frac{1}{||P_0||} P_0(t) = P_0(t) \quad \text{Eq. 22}_0 \, (m = 0)$$

$$P_1(t) = \frac{1}{2||P_1||} [p(t - T) - p(t + T)] \quad \text{Eq. 22}_1 \, (m = 1)$$

-continued $$P_2(t) = \frac{1}{4||P_2||} [p(t - 2T) - 2p(t) + p(t + 2T)]$$ Eq. 22₂ (m = 2)

$$P_3(t) = \frac{1}{8||P_3||} [p(t - 3T) - 3p(t - T) + 3p(t + T) - p(t + 3T)]$$ Eq. 22₃ (m = 3)

$$P_4(t) = \frac{1}{16||P_4||} [p(t - 4T) - 4p(t - 2T) + 6p(t) - 4p(t + 2T) + p(t + 4T)].$$ Eq. 22₄ (m = 4)

and so on.

Figure 5:
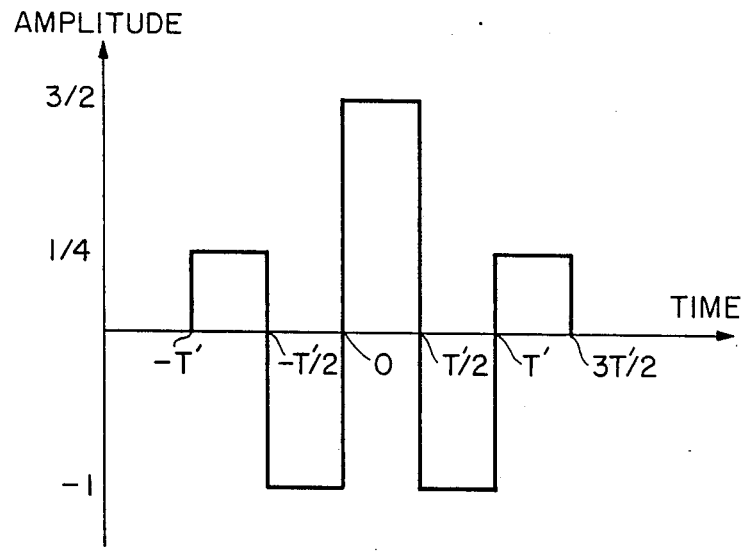
FIG. 5 is a plot of amplitude versus time of a pulse waveform of the wave described by Equation 224.

A voltage waveform of the type described by $P_4(t)$ in Equation 22 is depicted in FIG. 5 wherein at $t = -T$ to $-T/2$ the voltage amplitude A is $\frac{1}{4}$, at $t = -T/2$ to 0, A is $-1$, at $t = 0$ to $+T/2$; A is $+3/2$, at $t = +T/2$ to T, A is $-1$ and at $t = +T$ to $3T/2$ A is $+\frac{1}{4}$.

The above theory is next applied to a specific example of creating sinusoidally coded Nyquist Pulses. It will be demonstrated that by looking in the time domain good ($\geq 70\%$) eye opening can be obtained even in the presence of sinusoidal encoding. Thus, baseband sinusoidally encoded data can be mixed with baseband telephone voice with all the advantages of high performance, high speed, low cost and low cross-talk.

Let $p(t)$ be a double frequency Nyquist Pulse of the form used in DDS, i.e., $$p\left(\frac{kT}{2}\right) = \begin{cases} A \text{ if } k = 0 \\ 0 \geq k \in \{I, k \neq 0\} \end{cases}$$ Equation 23

Recall that if the data signal for transmission (which may already be AMI encoded) was $\{---, a_{-1}, a_0, a_{+1}, ---\}$ then the PAM signal transmitted was:

$$s(t) = \sum_{j=-\infty}^{\infty} a_j p(t - jT)$$

and, hence, in view of Equation 23;

$$s(o) = \sum_{j=-\infty}^{\infty} a_j p(-jT) = A a_0.$$ Equation 24

Equation 24 is the reason why the eye was 100% open and data could be recovered with no ISI.

Now consider the PAM process;

$$s_m(t) = \sum_{j=-\infty}^{\infty} a_j p_m(t - jT)$$ Equation 25 which, using Equation 21, can be rewritten as:

$$s_m(t) = \frac{(-\frac{1}{2})^m}{||P_m||} \sum_{j=-\infty}^{\infty} \sum_{i=0}^{m} \binom{m}{i} a_j p[t - jT - (m - 2i)T']$$ Equation 26

Recalling that $T' = T/4$, one can again rewrite Equation 26 as:

$$s_m(t) = K \sum_{j=-\infty}^{\infty} \sum_{i=0}^{m} \binom{m}{i} \cdot a_j \cdot p\left[t - (4j + m - 2i)\frac{T}{4}\right]$$ Equation 27 where $K \triangleq \frac{(-\frac{1}{2})^m}{||P_m||}$

Now, four cases can be separated:
Case 1: m=4l
Case 2: m=4l+1
Case 3: m=4l+2
Case 4: m=4l+3.

Expanding Equation 27 on case 1 and using Equation 23, one writes:

$$s_{4l}(o) = K \sum_{j=-\infty}^{\infty} \sum_{i=0}^{4l} \binom{4l}{i} \cdot a_j \cdot p\left[(2i - 4l - 4j)\frac{T}{4}\right]$$ Equation 28A $$= K \sum_{j=-\infty}^{\infty} \sum_{i=0}^{4l} \binom{4l}{i} \cdot a_j \cdot p\left[(i - 2l - 2j)\frac{T}{2}\right]$$

$$= KA \sum_{\substack{i=0 \\ i=\text{even}}}^{4l} \binom{4l}{i} a_{\frac{i}{2}-l}$$

Similar operations on Equation 27 for case 2, 3 and 4 using Equation 23 can be used to show:

$$s_{4l+1}\left(\frac{T}{4}\right) = KA \sum_{\substack{i=0 \\ i=\text{even}}}^{4l+1} \binom{4l+1}{i} \frac{a_i}{2} - 1$$ Equation 28B $$s_{4l+2}\left(\frac{T}{2}\right) = KA \sum_{\substack{i=0 \\ i=\text{even}}}^{4l+2} \binom{4l+2}{i} \frac{a_i}{2} - 1$$ Equation 28C $$s_{4l+3}\left(\frac{3T}{4}\right) = KA \sum_{\substack{i=0 \\ i=\text{even}}}^{4l+3} \binom{4l+3}{i} \frac{a_i}{2} - 1$$ Equation 28D Clearly, Equation 27 can be evaluated at different time points instead of at t=o, T/4, T/2, 3T/4 upon which Equations 28A, B, C and D were based. For example, it can be shown that:

$$s_{4l}\left(-\frac{T}{2}\right) = KA \sum_{\substack{i=0 \\ i=\text{odd}}}^{4l} \binom{4l}{i} \frac{a_{i-1}}{2} - 1$$ Equation 29 and so on.

In conclusion, it has been shown that forming Nyquist or Almost Nyquist pulses into waveforms of the type described in Equation 22 is the equivalent of sinusoidally encoding Nyquist or Almost Sinusoidally Nyquist pulses. Furthermore, sinusoidal coding results in known inter-symbol interference, since all the coefficients in Equations 28A, B, C, D and 29 are known. The following example shows that knowledge of the ISI can result in very simple receiver structures not requiring adaptive techniques, such as Viterbi decoders, etc. to establish reliable communication.

IV.

SINUSOIDAL ENCODER

A practical realization of sinusoidal encoding is shown in FIG. 6. The function of the sinusoidal encoder 600 of FIG. 6 is to sinusoidally encode the pulses p(t) of the input data stream as a function of $\sin^m\theta$ to redistribute the frequency of the energy in the data pulses from the voice band to a higher frequency. As shown in Part III, this encoding can be accomplished by forming appropriately weighted linear and delayed versions of the original pulse in accordance with the degree of redistribution required. More specifically, Equation 22 shows that $p_m(t)$ may be formed of $m+1$ delayed and advanced versions of $p(t)$. The delayed versions are the terms in Equation 22 corresponding to the range of $i=0$ to $i=$ the integer less than or equal to $m/2$ and the advanced versions are the terms corresponding to $i=$ the integer greater than or equal to $m/2$. The particular weighting of the versions is dependent on m and is shown in Table II below for $i=0$ to m and specific m's = 1 to 4 and the general case $m=m$.

is clocked-in twice. The output impedance of each cell or stage of the shift register has an impedance less than or equal to 50 ohms. The scale factor resistors (labelled 28 and 30) are chosen to make the minimum resistor $R_{min} \Delta$ Minimum $[R_i, i=0, 1, \text{---} m]$ such that $R_{min}$ is far, far greater than 50 ohms.

The pulse response of such a circuit is $p_m(t)$ and since the circuit is linear, the output $s_m(t)$ is:

$$s_m(t) = \sum_{j=-\infty}^{\infty} a_j \cdot p_m\left(t - j\frac{T}{2}\right) \quad \text{EQUATION 30}$$

as desired.

In the circuit of FIG. 6, each original pulse p(t) in the data stream or sequence 22 is combined with its delayed or advanced versions $p(t-(kT)/2)$, where k is an element of the set of integers {I}. The delayed and advanced versions are combined with the original pulse to produce a sinusoidally encoded pulse waveform of the form $\sin^m\theta$; wherein m is an integer greater than or equal to 1. The resultant encoded pulse is of the form

TABLE II

| i | m = 1 | m = 2 | m = 3 | m = 4 | General Case m = m |
|---|---|---|---|---|---|
| 0 | $K\binom{1}{0} = -K$ | $K\binom{2}{0} = K$ | $K\binom{3}{0} = K$ | $K\binom{4}{0} = K$ | $K\binom{m}{0}$ |
| 1 | $-K\binom{1}{1} = K$ | $-K\binom{2}{1} = -2K$ | $-K\binom{3}{1} = -3K$ | $-K\binom{4}{1} = -4K$ | $-K\binom{m}{1}$ |
| 2 | | $-K\binom{2}{2} = K$ | $K\binom{3}{2} = 3K$ | $K\binom{4}{2} = 6K$ | $K\binom{m}{2}$ |
| 3 | | | $K\binom{3}{3} = K$ | $-K\binom{4}{3} = -4K$ | $-K\binom{m}{3}$ |
| 4 | | | | $-K\binom{4}{4} = K$ | $K\binom{m}{4}$ |
| ⋮ | | | | | ⋮ |
| i | | | | | $(-1)^i K\binom{m}{i}$ |
| ⋮ | | | | | ⋮ |
| m | | | | | $(-1)^m K\binom{m}{m}$ |

In the circuit of FIG. 6, shift register 20 provides the delayed and advanced versions. Tapped weighting resistors $R_m$–$R_o$, in combination with scaling factor resistors 28 and 30, perform the weighting function and summer 26, the summing function.

The pulsed data in the form of PAM raw data pulses or bits ---$a_{-1}, a_0, a_1$---, to be encoded, is clocked into an n-stage CMOS shift register 20, the stages of which are coupled to respective weighting resistors $R_m$ to $R_o$, clocked with a clock of frequency 2/T, so that every bit shown in FIG. 5 for m=4. This is accomplished by coupling the data stream 22 to the input of the above-referenced shift register 20, successive stages 24 of which are coupled to output voltage divider networks.

The voltage divider networks comprise weighting resistors $R_m$, $R_{m-1}$, $R_{m-2}$, $R_{m-3}$ --- $R_{i-1}$, $R_i$ --- $R_1$, $R_o$ wherein m = the order or level of encoding and is equal or greater than 1 and i is an integer corresponding to the ith delayed pulse. The weighting resistors are alternately coupled to a precise positive potential (+Volt Rail) and a precise negative potential (−Volt Rail). The voltage divider network further includes resistor 28 equal to $R/\|P_m\|$ tied between the plus RAIL and ground; the junction of which is coupled to the positive input terminal of difference amplifier 26; and also includes resistor 30 tied between the negative RAIL and the output of difference amplifier 26. The negative RAIL is also coupled to the negative input terminal of summing amplifier 26 and the positive RAIL is coupled to the positive input terminal.

The generalized magnitude of the weighting resistors is shown in Table III, below, and for the specific cases of m=1 through 4, in TABLE II, previously noted.

TABLE III

| | i |
|---|---|
| $R_m = \left\| R/(-\tfrac{1}{2})^m \binom{m}{m} \right\|$ | m |
| $R_{m-1} = \left\| R/(-\tfrac{1}{2})^m \binom{m}{m-1} \right\|$ | m − 1 |
| $R_{m-2} = \left\| R/(-\tfrac{1}{2})^m \binom{m}{m-2} \right\|$ | m − 2 |
| $R_{m-3} = \left\| R/(-\tfrac{1}{2})^m \binom{m}{m-3} \right\|$ | m − 3 |
| $R_{i-1} = \left\| R/(-\tfrac{1}{2})^i \binom{m}{i-1} \right\|$ | i − 1 |
| $R_i = \left\| R_i/(-\tfrac{1}{2})^m \binom{m}{i} \right\|$ | i |
| $R_1 = \left\| R/(-\tfrac{1}{2})^m \binom{m}{i} \right\|$ | 1 |
| $R_o = \left\| R/(-\tfrac{1}{2})^m \binom{m}{o} \right\|$ | 0 |

The output of difference amplifier 26 is therefore equivalent to the sinusoidal encoding of the Fourier transform of the input data sequence pulses wherein each pulse p(t) has been linearly combined with its delayed and its advanced versions such versions being contained in the successive stages 24 of the shift register 20. The form in which they are combined is a function of the weighting resistors. In the case of m=4, they are combined as a function of $(1-\cos\theta)^2$ to produce pulse waveforms of the type previously shown in FIG. 5. In accordance with the discussion in part III, it has been shown that such coding removes the energy content of the input pulses from baseband to a higher frequency as "m" is increased. These coded pulses are then coupled through pulse response circuit, such as a third order Butterworth filter 32, for transmission over cable pairs to a suitable receiver described below.

Figure 7:
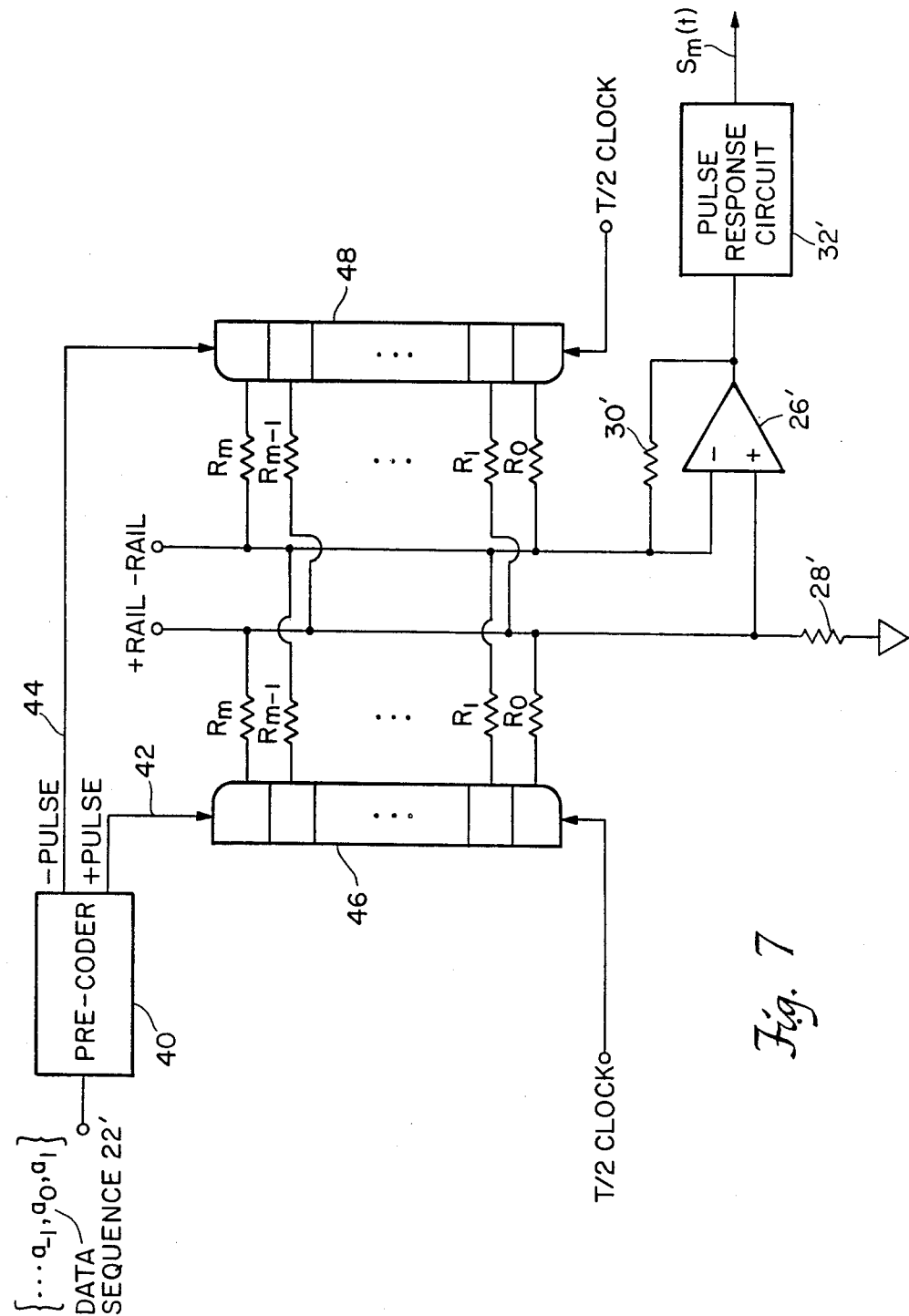
FIG. 7 is a schematic/logic diagram of a decoder for decoding sinusoidally encoded pulses $s_m(t)$ wherein "m"=4.

FIG. 7 is an alternate embodiment, in which like items carry corresponding numeral references with a prime suffix. The FIG. 7 embodiment shows the case of concatenated encoding, i.e., a pre-coding function, such as AMI, followed by sinusoidal encoding. Such pre-coding may produce other desirable spectral characteristics, such as a ZERO, at midband, achieved by partial response coding. In the case of AMI pre-coding, note that a ZERO is produced at D.C. and the spectral characteristics are shaped by a sine function; thereby helping to further eliminate energy from the low frequency band to be used for voice (POTS) frequency signalling. The pre-coder 40 breaks the AMI/PAM data signal 22' into two pulse rails, a plus pulse rail 42 and minus pulse rail 44, which are then separately encoded, as in FIG. 6, by their respective individual shift registers 46 and 48 and summed in operational amplifier 26' and coupled to filter 32'.

V.

SINUSOIDAL DECODING

A simple sinusoidal decoder will now be described for the specific case of m=4 sinusoidally encoded pulse communication.

Consider the case m=4, i.e., l=1 for which Equation 29 can be written as:

$$s_4\left(\tfrac{T}{2}\right) = KA\left[\binom{4}{1}a_{-1} + \binom{4}{3}a_o\right] \qquad \text{Equation 31}$$
$$= 4KA[a_{-1} + a_o]$$

wherein $a_o$ is the current bit and $a_{-1}$ is the previous bit. Note that the next bit $a_{+1}$ does not appear in Equation 31.

Now, consider the case where the sequence ---, $a_{-1}$, $a_o$, $a_1$, --- has already been AMI encoded. For this case, Equation 30 can only have the following values:

$$s_4\left(-\tfrac{T}{2}\right)=\begin{cases}\pm 4\,KA\text{ where one of }a_o\text{ or }a_{-1}=1\\ 0 \text{ otherwise}\end{cases} \qquad \text{Equation 32}$$

Figure 8:
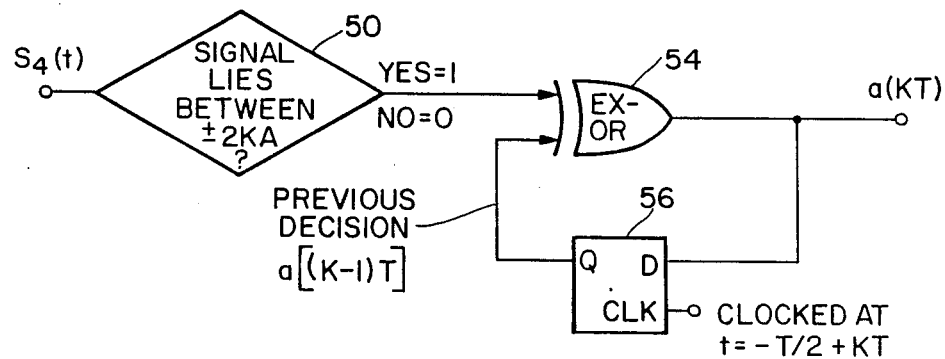
FIG. 8 is a schematic of a concatenated encoding system wherein AMI encoding is followed by sinusoidal encoding.

A receiver which satisfies the conditions of Equation 31 is shown in FIG. 8. A sinusoidally encoded AMI/PAM received signal $s_4(t)$ of the form shown in FIG. 5, is sampled by window comparator 50 to determine if it lies between + or −2 KA; wherein K is a $$\text{scaling factor} = \frac{(-\tfrac{1}{2})^m}{P_m},$$

i.e., for m=4, $\|P_m\|=0.523$ (Equation 14) and K=0.239 A; and A=peak amplitude of the symbol being used. Since A is known in advance, this information can be used in the receiver to create maximum power conditions. If the answer from the window comparator 50 is "Yes", a one pulse is transmitted from comparator 50 to logic circuit 52 to provide one of two inputs to EX-OR Gate 54. The other input terminal of EX-OR Gate 54 is coupled to the output of Delay Flip-Flop 56 which is clocked at time intervals corresponding to $t=-T/2+kT$. Flip-Flop 56 produces an output which is a function of the previous decision (a[(k−1)T], i.e., the D-Input to Flip-Flop 56 that occurred one clock pulse earlier. The output of EX-OR 54 is coupled back to the D-terminal of Flip-Flop 56 to provide the previous decision. Thus, the EX-OR 54 output is a(kT) and coincides with a clock pulse at $t=T/2+kT$. From Equation 31 and FIG. 6, it should now be clear that:

$$s_4(-T/2+kT) = a[(k-1)T] \oplus a(kT) \quad \text{Equation 33}$$

where: $\oplus$ means an Exclusive/Or function. Inverting Equation 33, it can be seen that:

$$a(kT) = a[(k-1)T] \oplus s_4(-T/2+kT) \quad \text{Equation 34}$$

Thus, once the correct start-up condition, $a_o$, has been set up, the receiver will continue to generate the correct sequence $\{a_k, k=0, 1, ---\}$. As can be recognized, this receiver can cause infinite error propagation if a single error is made. This can be resolved by locating the Exclusive/OR function at the transmitter prior to AMI encoding. Alternatively, in a system where $a_k$ can be forced to a known condition periodically, for example, in a time-coded multiplex (TCM) system, prior Exclusive/OR encoding at the transmitter is not necessary since the errors will propagate only until the next forcing instant. Thus, in a TCM system, errors can be made to propagate only for a frame.

VI.

DDOV SYSTEM

Figure 9:
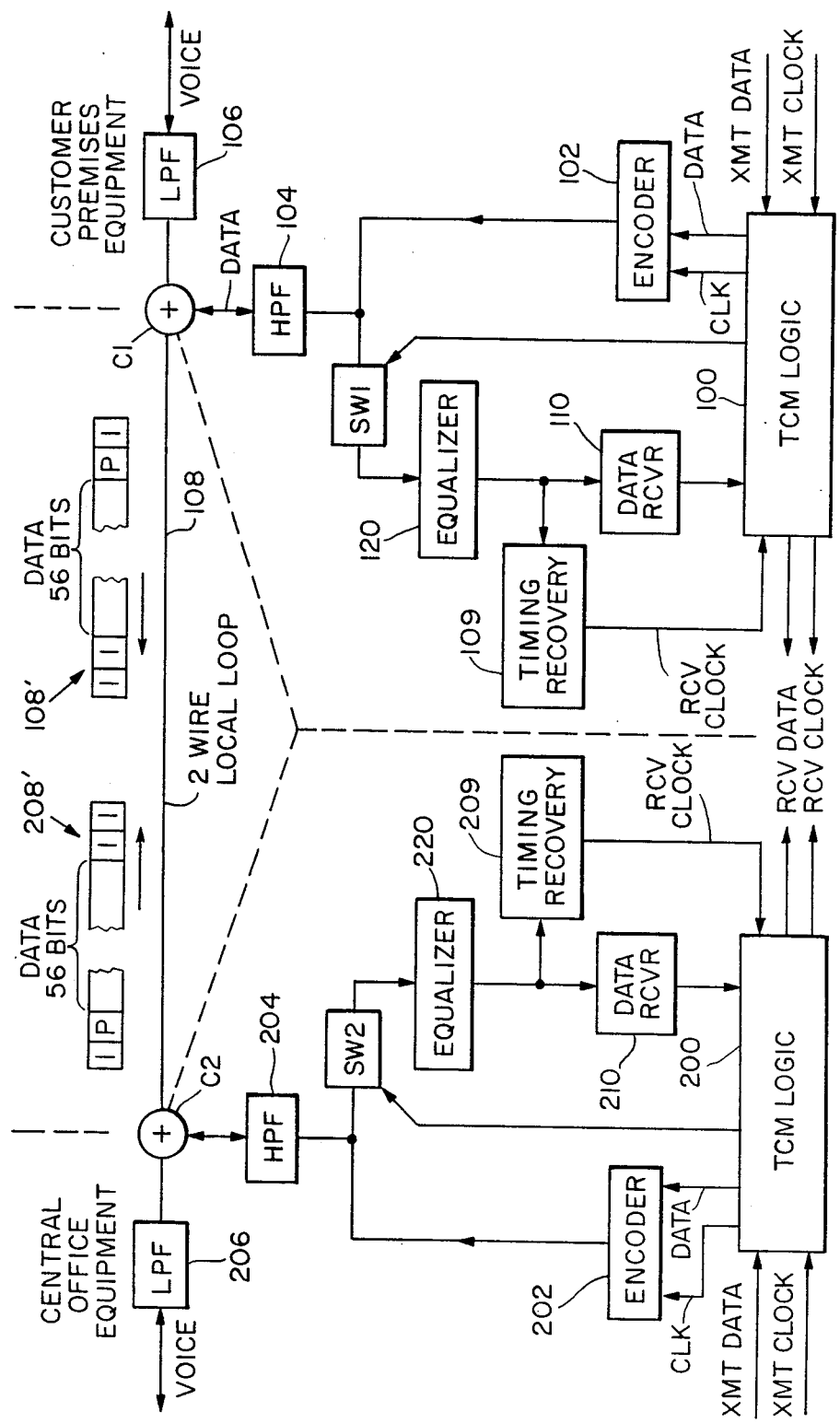
FIG. 9 is an overall block diagram of a digital data over voice system of the invention.

FIG. 9 illustrates a Digital Data Over Voice (DDOV) system of the invention in block diagram form. In this embodiment, voice frequency signals from a voice frequency communication system, such as telephone set 700, at a frequency below 4 kHz originating at Customer Premises Equipment (CPE) are transmitted from coupling circuit C1 along with sinusoidally encoded bursts of Time Compressed Multiplexed (TCM) data signals. TCM logic circuit 100 at the CPE, using well-known techniques, accepts serial Transmit Data and Transmit Clock pulses at base-band frequency, performs the TCM function and transmits clock pulses and data pulses 108' in bursts of short duration. Correspondingly, TCM logic circuit 200 performs a similar function at the Central Office Equipment (COE); and data and timing signals 208' are transmitted in the opposite direction from coupling circuit C2 over wire pair 108 in the opposite direction toward C1.

Typically, the CPE station is slaved to the COE station so that the master station (COE) transmits first in one burst 208' during one time slot in one direction, then the slave transmits in one burst 108' in a later time slot. A time slot gap in transmission of time duration greater than the round trip delay of the longest anticipated cable is provided between transmissions to avoid collision. One burst from the master, plus a corresponding burst from the slave, together with the gap, constitute a "frame". Then the process commences again with transmission of another frame. This process is called "ping-pong" communication.

In a specific embodiment, the data transmission format for each burst 108' or 208' may comprise 56 bits of data preceded by a two bit timing header of successive ONE'S and followed by a tail of two bits for a total of 60 bits per burst in each direction. A typical time gap between bursts is 20 bits in length, resulting in a total frame of 140 bits; which at 56 Khz, is 2.5 m sec. duration and a frame rate of 400 Hz.

The tail in the format consists of an ODD parity bit followed by a ONE. With ODD parity, the total number of ONES in the burst, up to and including the parity bit itself, is forced by the TCM Transmission Logic, to be an odd number by appropriately making the parity bit a ZERO or a ONE. Therefore, since the last bit in the tail is a ONE, every burst has an even number of ONE'S. Hence, every burst begins by the same deviation transition, despite AMI encoding. The result is ZERO D.C. per burst, which results in no bipolar violations from frame-to-frame.

A Sinusoidal Encoder 102 or 202, at the CPE or COE, respectively, of the type shown and described in FIG. 6, encodes the clock and data pulses to empty the energy content of the clock and data pulses from the voice frequency band to a higher frequency band.

The encoded clock and data pulses are coupled through a High Pass Filter 204 or 104 at the CPE or COE, respectively, having cut-off frequency at 8 kHz and pass to coupling circuit C1 or C2, respectively, for coupling to a single pair of standard telephone wires forming a local loop cable 108. During transmission, analog switches SW1 and SW2 are opened to prevent transmitted data from being coupled into the respective receivers 110 or 210.

Simultaneously, the low frequency voice signal (VOICE) is coupled in the normal manner through low pass filters 106 or 206 to coupling circuits C1 or C2 and across the same cable 108; which cable forms the standard tip and ring conductors for voice telephone communication. Filters 106 or 206 prevent the data signals from interfering with the voice signal and high pass filters 104 or 204 perform a similar function preventing any residual energy of the data signal remaining in the 0-4 kHz band from being passed out to the local loop and interfering with the voice signals.

At the COE, the sinusoidally encoded data and clock pulses are coupled from HPF filter 204 to a cable equalizer 220, wherein the signals are compensated for cable losses associated with the cable 108, as described in the aforementioned patent application. After compensation, the signals are coupled to data receiver 210, which is of the type described in FIG. 8 to recover the original clock and pulse data generated from TCM 100. The recovered clock and data signals are demultiplexed and returned to their pre-burst form in (Master) TCM LOGIC Circuit 200.

Similarly, voice signals in the opposite direction are coupled through C1 to LPF 106 to a voice frequency communication system, in this case, a voice switch (not shown), while burst data is coupled from C1 through HPF 104 through closed switch SW1 to equalizer 120 and decoded in data receiver 110.

Figure 10:
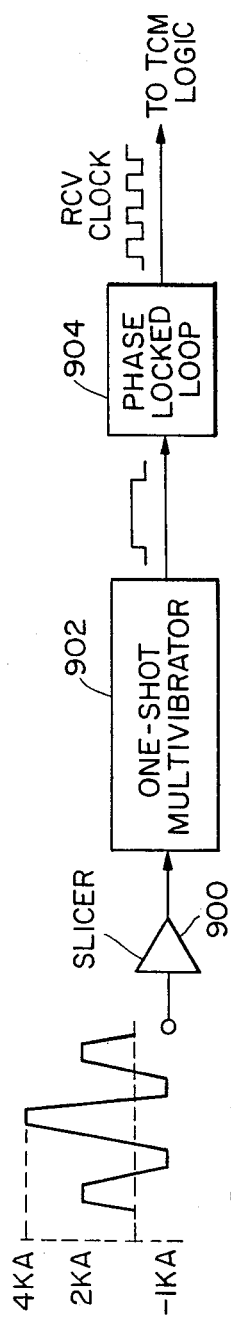
FIG. 10 is a block diagram of the timing recovery circuit of the invention.

The header bits, parity bits, and the trailing 1 bit (called "tail") are used in the timing recovery circuit 109 to recover the master data clock, which is then used to synchronize the TCM logic circuits in a well-known manner. Referring to FIG. 10, the timing recovery circuit 109 comprises a slicer circuit 900, which determines when the equalized incoming signals exceeds 2 KA and is therefore a data signal. When the incoming signal exceeds the threshold level of 2 KA, a one shot multivibrator 902, having a time constant greater than the burst period, is triggered to provide the leading edge and lagging edge of the burst period for gating a phase lock loop circuit 104, which regenerates the clock pulses for synchronization. The format of the data signals enables the timing recovery circuit to provide the burst rate from which the PLL in the slave station derives the received clock. Other standard timing recovery algorithms can also be employed.

VII.

COUPLING CIRCUITS

Additional details of the coupling circuits C1 and C2, which perform the line coupling, filtering, return loss optimization, and bridging functions of the invention will now be described in connection with FIG. 11.

Figure 11:
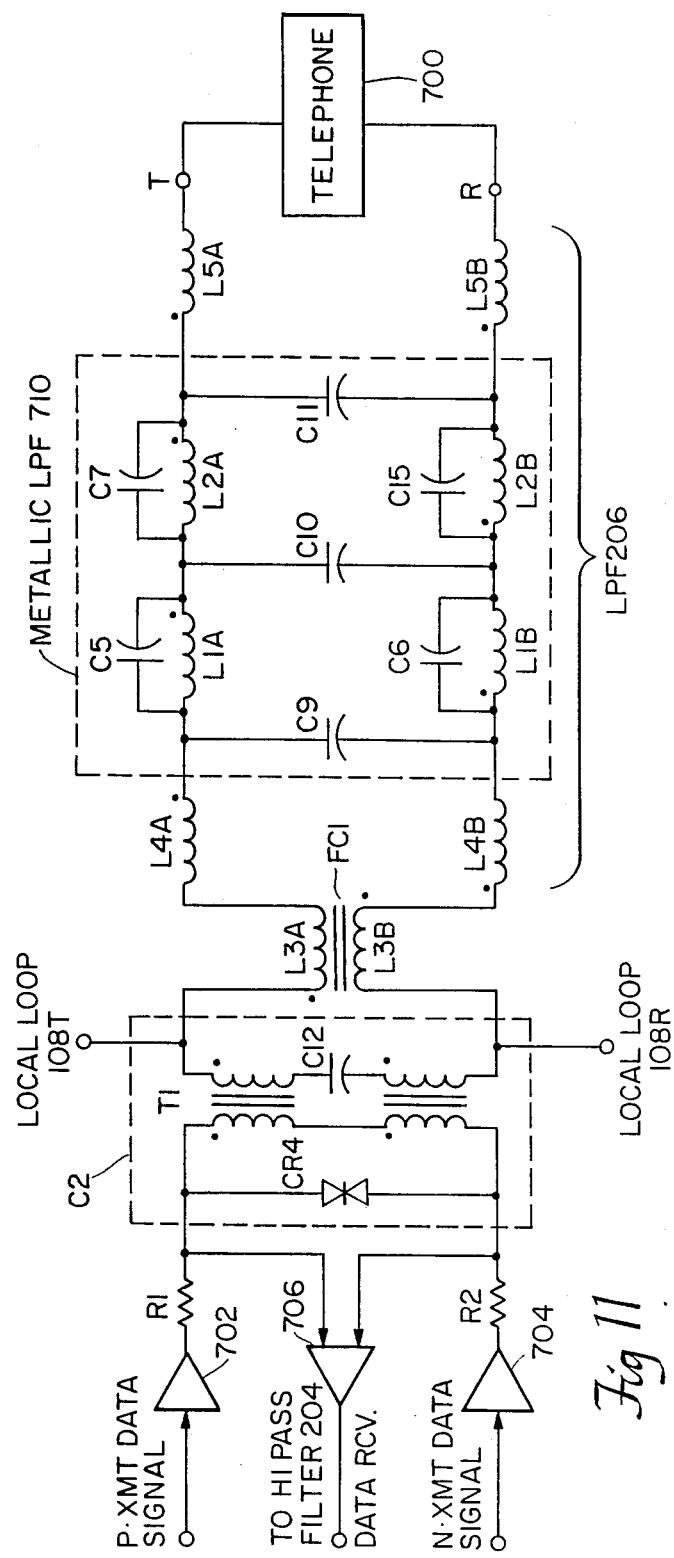
FIG. 11 is a detailed schematic of the coupling and filter circuits of the invention.

In the circuit of FIG. 11, one coupling circuit C2 and low pass circuit 206 are shown in detail. It should be noted that at the customers premises equipment (CPE) identical circuits C1 (FIG. 9) and 106 are provided. The circuit C2 couples incoming and outgoing voice and data signals across the tip (108T) and ring (108R) lines of the local loop cable 108 with appropriate impedance matching at the frequency band of each.

Positive and Negative encoded data signals for transmission are coupled from amplifiers 702 and 704, respectively, to impedance matching resistors R1 and R2 coupled across the primary windings of pulse transformer T1 of coupling circuit C2. Amplifier 702 amplifies the uninverted positive transmit encoded pulses generated by the encoder of FIG. 6 or FIG. 7. For balanced line transmission, the positive pulses are inverted and amplified in amplifier 704.

Resistors R1 and R2 have an impedance of 67.5 ohms, each, for a total of 135 ohms, satisfying the requirement that the outgoing data pulses see a characteristic impedance of 135 ohms at the data frequency. Ideally, the voice frequency band should be matched to a characteristic impedance of 900 and 2.15 microfarads at the voice frequencies.

Capacitor C12, having a capacity of 0.039 microfarads, is coupled between the secondary windings of balanced transformer T1. At voice frequencies, C1 is part of a low pass voice frequency filter; whereas at data frequencies, C1 is an effective short circuit, so that T1 at data frequencies is essentially a 1:1 transformer. Furthermore, at the data frequencies, the inductors L4A and L4B, in series with the secondary windings of T1, represent a high impedance, thereby buffering the data signals from the telephone load seen through the low pass filter stages.

In order to avoid the passage of ringing current to the telephone receiver 700, the coupling circuit and filter must be carefully structured to avoid unbalancing the signal. Thus, the data signal is coupled using a balanced transformer T1 to keep earth/ground parasitics balanced and is then coupled to a difference amplifier 706 to a balanced receiver and high pass filter 204 (FIG. 9).

The ringing signal on the local loop has a longitudinal signal component and a metallic signal component. Inductors L5A and L5B, together with C9, C10 and C11 in parallel across the line, form a second order low pass filter, which is transparent to the metallic component of ringing current and suppresses the longitudinal component of ringing circuit. Preferred values for each component are as follows:

L5A—25 millihenry
L5B—25 millihenry
C9—0.051 microfarad
C10—0.056 microfarad
C11—0.022 microfarad The metallic filter is comprised of four parallel coupled capacitors and inductors C5, L1A; C7, L2A; C6, L1B; and C15, L2B having the following preferable values:

C5—0.022 microfarad
C7—0.033 microfarad
C6—0.022 microfarad
C15—0.033 microfarad
L1A—8.5 millihenry
L2A—8.8 millihenry
L1B—8.5 millihenry
L2B—8.8 millihenry.

Suppressing the longitudinal ringing component extends the useful range of the system above 12-13 kilofeet of 26 gauge copper loops to at least 18 kilofeet of 26 gauge copper wire.

It should be noted that the impedance matching structure, above described, results in an optimum average return loss over the low frequency band of the voice signals 200 Hz to 1.0 kHz, the mid-frequency band of 500 Hz to 2500 Hz and the high frequency band of 2 kHz to 3.3 kHz.

The return loss, which is a measure of the imperfection in the impedance termination, is a function of frequency. At the low and high frequencies, singing return loss must not be greater than 10 db at the mid-frequencies and echo return loss must not be greater than 18 db. Computer optimization, together with the constraint of practical component values, have gone into generating the values of the components described above. These component values result in singing return losses at low and high frequencies, to exceed 20 db, while echo return loss exceeds 26 db.

Figure 12:
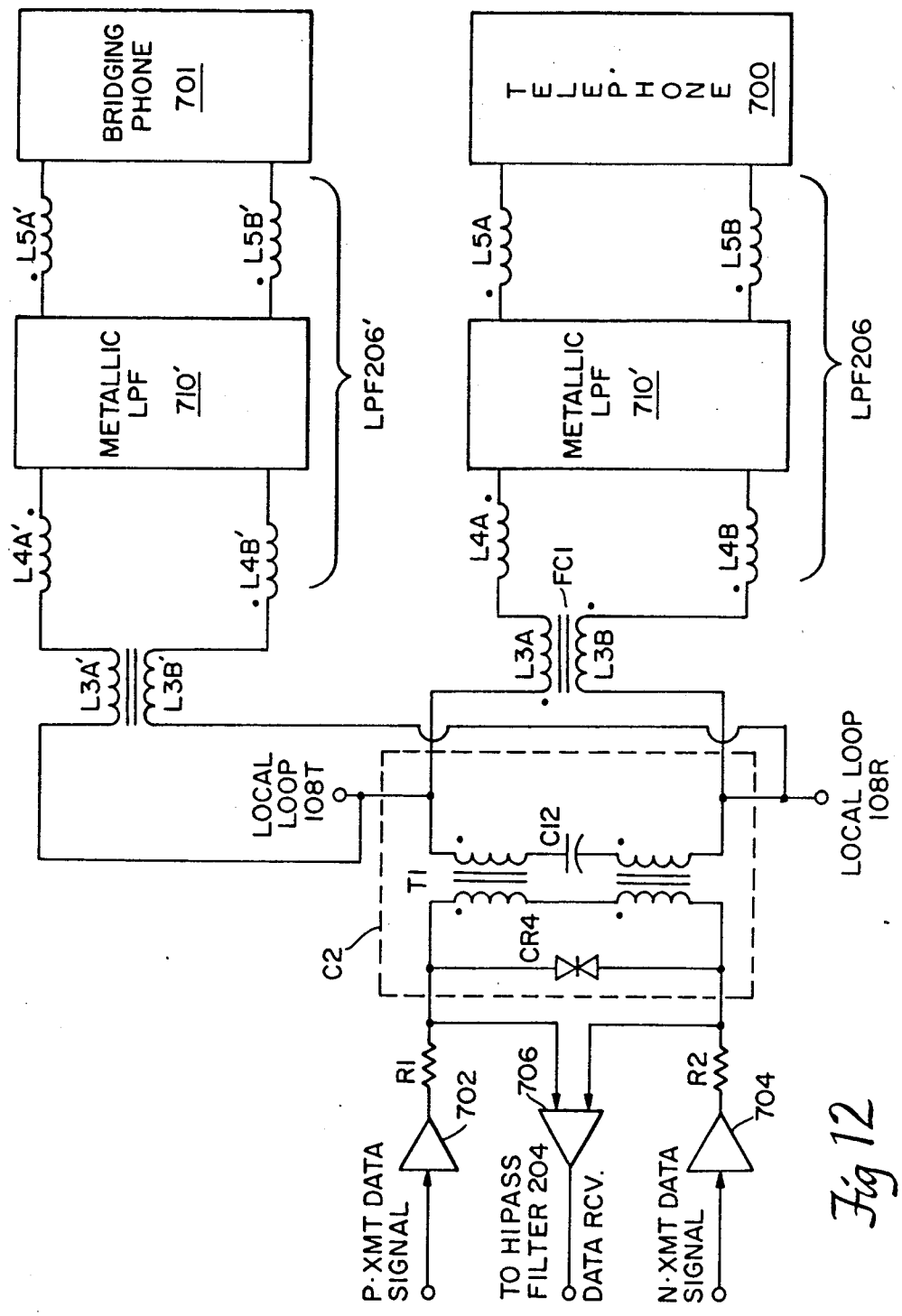
FIG. 12 is a partial schematic partial block diagram showing an embodiment in which a bridging phone is coupled into the system.

When it is desired to bridge a second phone 701 (See FIG. 12) across the telephone lines (108T and 108R), isolation is required to preserve voice frequency impedance matching when the primary phone 700 is OFF-Hook, thereby changing the load on the line. Also, the second phone 701 has to be equipped with a low pass filter (LPF) 206'.

For isolation purposes, each phone coupler is provided with a saturable ferrite reactor with very high inductance. The reactor is formed of respective tightly coupled inductors L3A and L3B and L3A' and L3B' coupled together by ferrite cores FC1 and FC1' forming a composite coupled inductance exceeding 2 H. When either phone 701 or 700 is OFF-Hook, DC current flows through its reactor windings L3A' and L3B' or L3A, L3B, respectively. Its reactor saturates at 1 or 2 milliamps of current, effectively eliminating itself from the circuit. The reactor in front of the ON-Hook phone is not saturated. When the OFF-Hook phone is placed ON-Hook, DC current flow stops and the inductors L4A and L4B, or L4A', L4B', which are fairly large, i.e., much greater than 0.5 Henry, do not effect the tuning of the low pass filter at the voice frequency.

EQUIVALENTS

This completes the description of the preferred embodiments of the invention. Those skilled in the art may recognize many variations thereof. The invention should not be limited, except as required by the scope of the following claims and equivalents thereof.

What is claimed is:

1. Apparatus for encoding data signals for transmission at a predetermined rate over telephone lines in the presence of voice band telephone signals such that the frequency spectrum of the data signals is substantially removed from the voice band and is shifted to a higher frequency spectrum comprising:
   (a) generator means for generating pulsed data signals;
   (b) coding means for shifting the frequency spectrum of the data signals to produce encoded data signals by forming linear combinations of said pulsed data signals with delayed and advanced versions thereof to encode the pulses in the frequency domain in the form $\sin^m \theta$ wherein $\theta = \pi fT/4$; and wherein m is an integer greater than or equal to 1, f is a frequency variable and T is the reciprocal of the rate of the data being transmitted.

2. The apparatus of claim 1 wherein the data signals are in the form of substantially Nyquist pulses.

3. The apparatus of claim 1 wherein m is equal to 4.

4. Telephone communication apparatus comprising an encoder responsive to AMI encoded pulsed data signals for forming linear combinations of said pulsed data signals to encode the pulses in the time domain resulting in a frequency domain spectrum in the form of $\sin^m \theta$ wherein $\theta = \pi fT/4$ and m is an integer equal to or greater than 1, f is a frequency variable and T is the reciprocal of the rate of data transmitted to transform energy in said pulses from a lower frequency region to a higher frequency region, thereby to avoid substantial interference with base band signals.

5. The apparatus of claim 4 wherein the encoder comprises a coding means for linearly summing m+1 weighted, delayed and advanced versions of the data signals, which delayed and advanced versions are weighted by a scaling factor times the ratio of m factorial divided by i factorial times (m−i) factorial wherein i is the ith version being weighted and m is an integer equal to one or more.

6. The apparatus of claim 5 wherein m is equal to 4.

7. The apparatus of claim 5 wherein the coding means is accomplished by a pulse function shaping system comprising:
 (a) a rail former for dividing said data signals into two sets of data streams of sequential alternate pulses; wherein one data stream comprises positive going pulses, while the other data stream comprises negative going pulses; and
 (b) a time domain filter for producing a weighted sum voltage waveform from said data streams consisting of $(1 - \cos 2\theta)^{m/z}$ m is an integer greater than or equal to 1.

8. The apparatus of claim 5 wherein the coding means comprises a transversal filter means comprising a CMOS shift register having successive stages and wherein the data signals to be encoded are coupled to the first stage thereof and the output of each successive stage is coupled to resistor weighting means for weighting said signal with alternate weighting means forming positive and negative voltage divider networks coupled to a difference amplifier.

9. The apparatus of claim 7 wherein m=4.

10. The apparatus of claim 7 wherein the time domain filter comprises a pair of n-stage shift registers with input and output terminals with weighting resistors coupled to the output terminals of each n-stage and wherein one data stream is coupled to the input terminal of one shift register and the other data stream is coupled to the input terminal of the other shift register.

11. The apparatus of claim 10 further including a first transmitter and first receiver at a first node and a second transmitter and second receiver at a second node and
 (a) a two wire balanced telephone line connecting said nodes;
 (b) a high pass filter coupled across one end of said line;
 (c) a low pass filter coupled across said one end of said line; and
 (d) wherein said coding means is coupled to said high pass filter and coded pulses are coupled through said high pass filter and voice band telephone signals are prevented from passing through said high pass filter; whereas conversely, voice band signals pass through said low pass filter and shaped pulses are not.

12. Apparatus for encoding data signals wherein the encoding is of the form $\sin^m \theta$ wherein $\theta = \pi fT/4$; and wherein m is an integer greater than or equal to 1, f is a frequency variable and T is the reciprocal of the rate of the data signals being transmitted to produce encoded data signals for transmission at a predetermined rate over telephone lines in the presence of voice band telephone signals such that the frequency spectrum of the data signals is substantially removed from the voice band and is spread over a higher frequency spectrum comprising:
 transversal filter means for linearly summing m+1 weighted, delayed and advanced versions of the data signals, which versions are weighted by the product of a constant and the ratio of m factorial divided by i factorial times (m−i) factorial wherein i is the ith version weighted and m is an integer.

13. The apparatus of claim 12 wherein m=4, the first version is weighted by a constant factor K, the next version is weighted by a constant factor −4K, the next version is weighted by a constant factor 6K, the next version is weighted by a constant factor −4K, and the last version is weighted by a constant factor K.

14. A communication system comprising two nodes linked by a pair of conductors for concurrent transmissions of voice frequency signals and bursts of higher frequency encoded data signals from a first node to a second node and subsequent reception of concurrent transmissions of voice frequency signals and bursts of data signals from the second node to the first node over said pair of conductors;
 (a) said first node comprising:
  (i) first coupling means for coupling voice frequency signals transmitted over said conductors from said second node through a first low pass filter to a voice frequency communication system and higher frequency encoded data signals transmitted over said conductors through a first high pass filter;
  (ii) first equalizer means coupled to said first high pass filter for compensating said encoded data signals for signal losses incurred in transmission over said pair of conductors;
  (iii) first data receiver means for decoding the encoded received data signals;
  (iv) first encoder means for accepting time compressed multiplexed data signals and sinusoidally encoding said data signals by a function of $\sin^m \theta$; wherein $\theta = \pi fT/4$ and m is an integer greater than unity, f is a frequency variable and T is the reciprocal of the data rate at which the data signals are transmitted to produce encoded data signals to substantially remove any signal energy in the voice frequency band; and
  (v) first means for passing said encoded data signals to said first high pass filter for transmission over said pair of conductors to said second node;
 (b) said second node comprising:
  (i) second coupling means for coupling voice frequency signals transmitted over said conductors from said first node through a second low pass filter to a voice frequency communication system and higher frequency encoded data signals from said conductors through a second high pass filter;

(ii) second equalizer means coupled to said second high pass filter for compensating said encoded data signals for signal losses incurred in transmission over said pair of conductors;

(iii) second data receiver means for decoding the encoded received data signals;

(iv) second encoder means for accepting time compressed multiplexed data signals and sinusoidally encoding said data signals by a function of $\sin^m\theta$; wherein $\theta = \pi fT/4$ and m is an integer greater than unity, f is a frequency variable and T is the reciprocal of the data rate at which the data signals are transmitted to produce encoded data signals to substantially remove any signal energy in the voice frequency band and second means for passing said encoded data signals to said second high pass filter for transmission over said pair of conductors to said first node.

15. The apparatus of claim 14 wherein the first and second coupling means each comprise:

(a) transformer means at the first node having a primary winding having first and second ends and a secondary winding having first and second ends with positive going encoded data signals from the first node being coupled to the first end of said primary winding of said first coupling means and negative going encoded data signals from the first node being coupled to the second end of said primary winding and wherein the first high pass filter means is coupled across said first and second ends of said primary winding and said secondary winding consists of two sub-windings coupled in series with a capacitor means, the ends of said secondary winding being coupled across said pair of conductors;

(b) said capacitor forming part of said first low pass frequency along with means for filtering a metallic component of ringing current induced on said conductor;

(c) inductor means coupled in series with each end of said secondary winding for filtering a longitudinal component of said ringing current.

16. The apparatus of claim 14 further including decoder means for decoder said encoded data signals and wherein said encoded signals are alternate mark inversion signals; said decoder means comprising:

(a) a window comparator for sampling said data signals, determining if such sample lies within an upper or lower voltage range, and generating a first pulse of a certain polarity if the sampled signal lies within such range;

(b) logic means having two input terminals and one output terminal, and wherein said first pulse is coupled to one of said input terminals for performing an exclusive/or function on signals coupled to said input terminals to produce an output signal at the output terminal which is the exclusive/or of the two input signals;

(c) delay means having an output terminal coupled to the input terminal of said logic means and an input terminal to which the output terminal of said logic means is coupled.

17. The system of claim 14 wherein transmission bursts from the first node to the second node and from the second node to the first node are separated in time by a time gap greater than the round trip delay time of the longest anticipated conductor line between nodes and each burst is comprised of 56 bits of data preceded by a 2 bit timing header of successive bits each set to ONE followed by a tail of 2 bits, said tail comprising an odd parity bit followed by a bit of ONE; such that every burst has an even number of ONE's.

18. The apparatus of claim 14, including reactor means for coupling a bridging phone across said conductors at said first node without affecting the impedance match of the first coupling means.

19. The apparatus of claim 18 wherein the reactor means comprises a ferrite core tightly coupled inductor pair.

20. A method for encoding data signals for transmission at a predetermined rate over telephone lines in the presence of voice band telephone signals such that the frequency spectrum of the data signals is substantially shifted from the voice band and is spread over a higher frequency spectrum comprising the steps of:

(a) generating pulsed data signals;

(b) forming linear combinations of said pulsed data signals with delayed and advanced versions thereof to sinusoidally encode the pulses in the frequency domain wherein the encoding is of the form $\sin^m\theta$ wherein $\theta = \pi fT/4$; and wherein m is an integer greater than or equal to 1, f is a frequency variable and T is the reciprocal of the rate of the data signals being transmitted to produce encoded data signals.

21. The method of claim 20 wherein m is equal to 4.

22. The method of claim 20 wherein the linear combinations comprise linearly summed m+1 weighted, delayed and advanced versions of the data signals, which delayed and advanced versions are weighted by a scaling factor times the ratio of m factorial divided by i factorial times (m−i) factorial wherein i is the ith version being weighted and m is an integer equal to one or more.

23. The apparatus of claim 22 wherein m is equal to 4.

24. A method for encoding data signals for transmission at a predetermined rate over telephone lines in the presence of voice band telephone signals such that the frequency spectrum of the data signals is substantially removed from the voice band and is spread over a higher frequency spectrum wherein the encoding is of the form $\sin^m\theta$ wherein $\theta = \pi fT/4$; and wherein m is an integer greater than or equal to 1, f is a frequency variable and T is the reciprocal of the rate of the data signals being transmitted to produce encoded data signals comprising the steps of:

(a) generating said data signals; and (b) linearly summing m+1 weighted, delayed and advanced versions of the generated data signals, which versions are weighted by the ratio of m factorial divided by i factorial times (m−i) factorial wherein i is the ith version weighted and m is an integer.

25. A method of communication in which two nodes are linked by a pair of conductors for transmissions of voice frequency signals and bursts of higher frequency encoded data signals wherein the encoding is of the form $\sin^m\theta$ wherein $\theta = \pi fT/4$; and wherein m is an integer greater than or equal to 1, f is a frequency variable and T is the reciprocal of the rate of the data signals being transmitted to produce encoded data signals from a first node to a second node and subsequent reception of transmissions of voice frequency signals and bursts of higher frequency data signals from the second node to the first node over said pair of conductors comprising the steps of:

(a) at the first node:
  (i) coupling voice frequency signals transmitted over said conductors from said second node through a first low pass filter to a voice frequency communication system and higher frequency encoded data signals transmitted over said conductors through a first high pass filter;
  (ii) compensating said encoded data signals for signal losses incurred in transmission over said pair of conductors;
  (iii) decoding the encoded received data signals;
  (iv) accepting time compressed multiplexed data signals and sinusoidally encoding said data signals to substantially remove any signal energy in the voice frequency band; and
  (v) passing said encoded data signals to said first high pass filter for transmission over said pair of conductors to said second node;

(b) at the second node:
  (i) coupling voice frequency signals transmitted over said conductors from said first node through a second low pass filter to a voice frequency communication system and higher frequency encoded data signals from said conductors through a second high pass filter;
  (ii) compensating said encoded data signals for signal losses incurred in transmission over said pair of conductors;
  (iii) decoding the encoded received data signals; and
  (iv) accepting time compressed multiplexed data signals and sinusoidally encoding said data signals to substantially remove any signal energy in the voice frequency band and second means for passing said encoded data signals to said second high pass filter for transmission over said pair of conductors to said first node.

26. The method of claim 25 including separating in time the data transmission bursts from the first node to the second node and from the second node to the first node by a time gap greater than the round trip delay time of the longests anticipated conductor line between nodes.

27. The method of claim 25 wherein each burst is comprised of 56 bits of data preceded by a 2 bit timing header of successive bits each set to ONE followed by a tail of 2 bits, said tail comprising an odd parity bit followed by a bit of ONE; such that every burst has an even number of ONE's.

28. Apparatus for encoding data signals in the form of $\sin^m \theta$ wherein $\theta = \pi fT/4$ and m is an integer equal to or greater than 1, f is a frequency variable and T is the reciprocal of the rate of data transmitted for transmission over telephone lines in the presence of voice band telephone signals such that the frequency spectrum of the data signals is substantially removed from the voice band and is shifted to a higher frequency spectrum comprising:

(a) means for generating said data signals; and
(b) means for shifting the frequency spectrum of the generated data signals to produce encoded data signals by linearly summing m+1 weighted, delayed and advanced versions of the generated data signals, which versions are weighted by the ratio of m factorial divided by i factorial times (m−i) factorial wherein i is the ith version weighted and m is an integer.

* * * * *

UNITED STATES PATENT AND TRADEMARK OFFICE
CERTIFICATE OF CORRECTION

PATENT NO. : 4,953,160

DATED : August 28, 1990

INVENTOR(S) : Dev V. Gupta

It is certified that error appears in the above-identified patent and that said Letters Patent is hereby corrected as shown below:

On the Title page,

In the Abstract, line 13, delete "factorial".

Col. 4, Equation 4, replace "$T \leq f \leq 1/T$" with -- $-1/T \leq f \leq 1/T$ --.

Col. 5, Equation 6, replace "$\sin \pi fT$" with -- $\sin \pi fT'$ --.

Col. 5, line 41, replace "(T/4)m" with --(T/4), m--.

Col. 5, Equation 8, replace "$1/T \leq f \leq \frac{1}{T}$." with -- $-\frac{1}{T} \leq f \leq \frac{1}{T}$ --.

Col. 6, Equation 9, replace "$\sin \pi fT$" with -- $\sin \pi fT'$ --; replace "$\frac{1}{T} \leq f \leq \frac{1}{T}$." with -- $-\frac{1}{T} \leq f \leq \frac{1}{T}$ --.

Col. 6, Equation 10, delete "$\phi$"; replace "$\sin^{2m} \pi fT$" with -- $\sin^{2m} \pi fT'$ --.

Col. 6, Equation 11, replace "$\sin^n az$" with -- $\sin^n ax$ --.

Col. 6, line 33, replace "niteratively" with --iteratively--.

Col. 6, line 53, delete ",", first occurrence.

UNITED STATES PATENT AND TRADEMARK OFFICE
CERTIFICATE OF CORRECTION

PATENT NO. : 4,953,160
DATED : August 28, 1990
INVENTOR(S) : Dev V. Gupta

It is certified that error appears in the above-identified patent and that said Letters Patent is hereby corrected as shown below:

Col. 7, lower portion of Equation 15, replace " $\frac{T}{|P_m|} T \int_{\phi}^{p/T} 0 \sin^{2m} \pi f T df$ "

with -- $\frac{T}{|P_m|} \int_{0}^{p/T} \sin^{2m} \pi f T' df$ --.

Col. 7, Equation 18, replace "$\Delta$" with --$\Delta$--.

Col. 8, upper portion of Equation 20, replace " $P_m(f)$ " with --

$P_m(f) \Delta$ --; replace " $\sin \pi f T$ " with -- $\sin \pi f T'$ --.

Col. 8, lower portion of Equation 20, replace " $\left[ \frac{e^{j\pi fT} - e^{-j\pi fT}}{2} \right]$ " with --

$\left[ -\frac{e^{j\pi fT'} - e^{-j\pi fT'}}{2} \right]$ --.

Col. 8, Equation 21, replace " $e^{-j\pi fT(m-2i)}$ " with

-- $e^{-j\pi fT'(m-2i)}$ --.

Col. 8, at line 22 continued to 23, replace " $\binom{m}{i}$ " with -- $\binom{m}{i} \Delta$ --.

Col. 8, Equation 22A, replace "T" with --T'--.
Col. 8, Equation 22B, replace "T" with --T'--.
Col. 8, Equation 22C, replace "T" with --T'--.

UNITED STATES PATENT AND TRADEMARK OFFICE
CERTIFICATE OF CORRECTION

PATENT NO. : 4,953,160
DATED : August 28, 1990
INVENTOR(S) : Dev V. Gupta

It is certified that error appears in the above-identified patent and that said Letters Patent is hereby corrected as shown below:

Col. 8, line 51, replace "K(m/i)" with -- $K\binom{m}{i}$ --.

Col. 8, Equation $22_1$, replace all occurrences of "T" with --T'--.

Col. 9, Equation $22_2$, replace all occurrences of "T" with --T'--.
Col. 9, Equation $22_3$, replace all occurrences of "T" with --T'--.
Col. 9, Equation $22_4$, replace all occurrences of "T" with --T'--.
Col. 9, line 18 continued through line 21, replace all occurrences of "T" with --T'--.
Col. 9, Equation 23, replace "≥" with --∀--.

Col. 9, Equation 26, replace "$\sum_{i=0}^{m} \, _{i}^{m}$" with -- $\sum_{i=0}^{m}\binom{m}{i}$ --;

replace "(m-2i)T" with --(m-2i)T'--.

Col. 10, line 12 (Case 1) through line 15 (Case 4), replace all occurrences of "m=41" with -- $m=4l$ --.

Col. 10, upper portion of Equation 28A, replace all occurrences of " 41 " with -- $4l$ --; replace " $\sum_{j=-\infty}^{\infty}\sum_{i=0}^{4}$ " with -- $\sum_{j=-\infty}^{\infty}\sum_{i=0}^{4l}$ --.

UNITED STATES PATENT AND TRADEMARK OFFICE
CERTIFICATE OF CORRECTION

PATENT NO. : 4,953,160

DATED : August 28, 1990

INVENTOR(S) : Dev V. Gupta

It is certified that error appears in the above-identified patent and that said Letters Patent is hereby corrected as shown below:

Col. 10, middle portion of Equation 28A, replace " $\sum_{j=-\infty}^{\infty} \sum_{i=0}^{41} \binom{41}{i}$ " with -- $\sum_{j=-\infty}^{\infty} \sum_{i=0}^{4l} \binom{4l}{i}$ --; replace " 21 " with -- $2l$ --.

Col. 10, lower portion of Equation 28A, replace " $\sum_{\substack{i=0 \\ i=even}}^{4} \binom{41}{i} a_{\frac{i}{2}-1}$ " with -- $\sum_{\substack{i=0 \\ i=even}}^{4l} \binom{4l}{i} a_{(\frac{i}{2}-1)}$ --.

Col. 10, Equations 28B, 28C and 28D, replace all occurrences of " 41 " with -- $4l$ --; replace all occurrences of " $\frac{a_i}{2}-1$ " with -- $a_{(\frac{i}{2}-1)}$ --.

Col. 10, Equation 29, replace " $S_{41}$ " with -- $S_{4l}$ --; replace " $\sum_{\substack{i=0 \\ i=odd}}^{41} 41 \frac{a_{i-1}}{i \quad 2} -1$ " with -- $\sum_{\substack{i=0 \\ i=odd}}^{4l} \binom{4l}{i} a_{(\frac{i-1}{2}-1)}$ --.

Col. 12, Table II, in the m=1, i=1 case, replace "= K" with --= -K--; in the m=3, i=3 case, replace " K", first occurrence, with -- -K--; in the m=4, i=4 case, replace "-K" with -- K--.

UNITED STATES PATENT AND TRADEMARK OFFICE
CERTIFICATE OF CORRECTION

PATENT NO. : 4,953,160
DATED : August 28, 1990
INVENTOR(S) : Dev V. Gupta

It is certified that error appears in the above-identified patent and that said Letters Patent is hereby corrected as shown below:

Col. 13, lines 39 and 40, replace " $\binom{m}{i}$ " with -- $\binom{m}{1}$ -- in Table III.

Col. 14, Equation 31, replace " $S_4 - \left(\frac{T}{2}\right)$ " with -- $S_4\left(-\frac{T}{2}\right)$ --.

Col. 14, Equation 32, replace " $\left(-\frac{T}{2}\right)$ " with -- $\left(-\frac{T}{2}\right)$ --.

Col. 14, line 48, replace " $P_m$ " with -- $|P_m|$ --.

Col. 18, lines 20 and 21, delete both occurrences of "not".

Signed and Sealed this

Fifteenth Day of June, 1993

Attest:

Attesting Officer

MICHAEL K. KIRK

Acting Commissioner of Patents and Trademarks